United States Patent
Wright et al.

(10) Patent No.: US 8,855,568 B2
(45) Date of Patent: Oct. 7, 2014

(54) ARRANGEMENT FOR REDUCING THE EFFECT OF SPURIOUS SIGNALS IN TELECOMMUNICATIONS AT RADIO FREQUENCIES

(75) Inventors: Gregory Alan Wright, Fair Haven, NJ (US); Hannu Karhuketo, Valkeakoski (FI)

(73) Assignee: Marisense Oy, Vantaa (FI)

( * ) Notice: Subject to any disclaimer, the term of this patent is extended or adjusted under 35 U.S.C. 154(b) by 404 days.

(21) Appl. No.: 12/918,541

(22) PCT Filed: Jan. 16, 2009

(86) PCT No.: PCT/FI2009/050040
§ 371 (c)(1),
(2), (4) Date: Nov. 15, 2010

(87) PCT Pub. No.: WO2009/103844
PCT Pub. Date: Aug. 27, 2009

(65) Prior Publication Data
US 2011/0053517 A1    Mar. 3, 2011

(30) Foreign Application Priority Data

Feb. 20, 2008    (FI) .................................... 20085157

(51) Int. Cl.
*H04B 1/00*    (2006.01)
*H04B 15/00*    (2006.01)
*H04B 1/10*    (2006.01)
*G06F 3/147*    (2006.01)

(52) U.S. Cl.
CPC ........ *H04B 1/1009* (2013.01); *G09G 2330/022* (2013.01); *G09G 2330/021* (2013.01); *G06F 3/147* (2013.01)

USPC .......................................... 455/63.1; 455/566

(58) Field of Classification Search
CPC .................................. H04K 3/68; H05K 9/00
USPC ........... 455/41.2, 41.3, 501, 502, 63.1, 67.11, 455/67.13, 68; 345/85, 107, 173; 705/67, 705/75
See application file for complete search history.

(56) References Cited

U.S. PATENT DOCUMENTS

| | | | |
|---|---|---|---|
| 5,504,475 A | 4/1996 | Houdou et al. | |
| 7,890,061 B2 * | 2/2011 | Kasher et al. | 455/67.11 |
| 2002/0167500 A1 * | 11/2002 | Gelbman | 345/204 |
| 2005/0151701 A1 | 7/2005 | Rosander et al. | |
| 2007/0066228 A1 * | 3/2007 | Leinonen et al. | 455/67.11 |
| 2007/0189242 A1 * | 8/2007 | Hosokawa et al. | 370/338 |
| 2007/0223413 A1 | 9/2007 | Igarashi et al. | |

FOREIGN PATENT DOCUMENTS

| | | |
|---|---|---|
| EP | 0447278 A2 | 9/1991 |
| WO | WO-2006087424 A1 | 8/2006 |

OTHER PUBLICATIONS

PCT/ISA/210—International Search Report—May 18, 2009.

* cited by examiner

*Primary Examiner* — Ping Hsieh
(74) *Attorney, Agent, or Firm* — Venable LLP; Eric J. Franklin

(57) ABSTRACT

An arrangement for reducing unwanted effects of spurious signals from interference sources in telecommunications at radio frequencies. A communication unit transmits and receives information at radio frequency. Receivers receive the radio signals from the communication unit and for reflecting radio signals back. A control unit is adapted at least to switch the transmitter or receiver of the communication unit off substantially at the frequency of the spurious signals.

22 Claims, 2 Drawing Sheets

ARRANGEMENT FOR REDUCING THE EFFECT OF SPURIOUS SIGNALS IN TELECOMMUNICATIONS AT RADIO FREQUENCIES

CROSS-REFERENCE TO RELATED APPLICATIONS

This application claims priority to Finnish patent application 20085157 filed 20 Feb. 2008 and is the national phase under 35 U.S.C. §371 of PCT/FI2009/050040 filed 16 Jan. 2009.

FIELD OF THE INVENTION

The invention relates to an arrangement for reducing the effect of spurious signals in telecommunications at radio frequencies.

According to an embodiment of the invention, the arrangement according to the invention can be applied, for example, in various display units for displaying data, equipped with en electronic display. Such displays include, for example, electronic displays for displaying price information on products and other product information in shops and warehouses. It is typical of the operating environment of these displays that the operating environment often contains a number of various devices which cause electromagnetic interference, which are installed in a stationary manner and which typically receive their driving energy via an electrical network. Such interference has a significant effect on these systems, since due to their operating principle, the radio signals used by the electronic displays for data communication have a very low power level.

BACKGROUND OF THE INVENTION

Conventionally, the price information on price tags in shops is always changed manually when the price of the product is changed. The new prices are printed out on paper or a corresponding material, and these tags with their new price markings are placed manually in a location reserved for the price tags on shelves in the sales premises. Thus, an employee must first find the correct location of the price tag to be updated, after which the previous price tag is removed and discarded and the new price tag is inserted in its position. A disadvantage in this arrangement is, among other things, the fact that the arrangement is very laborious and there is a high risk of mistakes. In case of a mistake, a situation may, for example, occur, in which the price information on the price tags on the shelves conflicts with the price information in the cash register system.

To avoid the above-mentioned drawbacks, electronic systems have been developed, in which electronic display units and their electronic displays are provided on the front edge or above the shelves, close to the products, in which the price information of the products can be changed in a centralized manner from the control centre of the system, or the like. This will facilitate and accelerate the updating of the price information to a significant extent. The data on the displays can be updated in a cabled or wireless manner, depending on the system. Cabled systems involve the problem that a wire connection must be provided for each display for data transmission and possibly also for power supply. For example in a normal retail outlets for daily consumer goods, the number of displays is relatively large; consequently, there must also be a large number of wires, which causes problems and limitations, for example, on the placement of the price displays.

Wireless systems do not require complex wirings but, in turn, they require transponders equipped with antennas in connection with battery-driven price displays, for communicating with the control unit of the system via suitable communication means.

When the aim is to minimize the power consumption of the display units and thereby to extend the service life of their batteries, one method in the communication between the communication means and the display units is such in which the transducer placed in the display units does not, by itself, implement active radio transmission so that the transmission power would be supplied from a separate power supply of the display unit, but the display unit only reflects the radio transmission of the communication means at a given moment of time and in a given way. The display unit can change the reflectance of its own antenna, wherein the display unit is capable of acknowledging or responding to messages of the communication means by simple reply messages. In the following, such a communication method will be described on a general level.

The communication means communicate with the display units by transmitting signals which are listened to by all the display units and from which a single display unit identifies a command relating to itself on the basis of a given display unit specific identification. After receiving a command relating to itself, the single display unit responds to the communication means by reflecting the transmission of the communication means itself back to the communication means, changed by a phase shift caused by a given time delay and at a given moment of time. Typically, after transmitting a command intended for a given price display, the communication means starts to transmit, for example, a carrier wave of a given type for a given period of time, the carrier wave being reflected back, with a given phase shift, by the price display that recognized the command. Consequently, the communication means is capable of identifying the reflected response as belonging to a given price display, because it knows to expect it within a given period of time after sending a unique command to said display. From its own transmission, the communication means can separate the reflected response that is significantly weaker in power, on the basis of the phase shift produced by the display device.

Because these reflected response signals are typically very weak and they can be disturbed and suppressed by other ambient reflections or signals, there is a need to reduce the effect of other interference sources on this communication by all possible means.

One of the typical interference sources in many premises is fluorescent lamps and the electronics associated with them. Particularly in shops and supermarkets, there are normally a large number of fluorescent lamps, so that the problem caused by them is significant in such arrangements. Other mains driven devices may also cause strong electromagnetic interference that suppresses weak reflected signals.

In the case of fluorescent lamps, for example, the interference caused by them may cover 0.5 to 20% of all the time used.

SUMMARY OF THE INVENTION

It is an aim of the present invention to reduce the above-mentioned problems and simultaneously to provide a low-cost, simple and reliable arrangement for reducing the effects of spurious signals in communications at radio frequencies, in which part of the communications is based on the use of reflected signals.

Among other things, the arrangement of the invention has the advantage that interference from fluorescent lamps and other sources of spurious signals can be eliminated or minimized to a sufficient extent, wherein for example display units applying communication at radio frequencies and utilizing reflected signals can communicate with the control unit without interference and in a reliable way via the communication means. Yet another advantage is that the arrangement can be implemented in a simple way and at low cost.

BRIEF DESCRIPTION OF THE DRAWINGS

In the following, the invention will be described in more detail by means of an embodiment example with reference to the appended drawings, in which.

DETAILED DESCRIPTION OF EMBODIMENTS OF THE INVENTION

Figure 1:
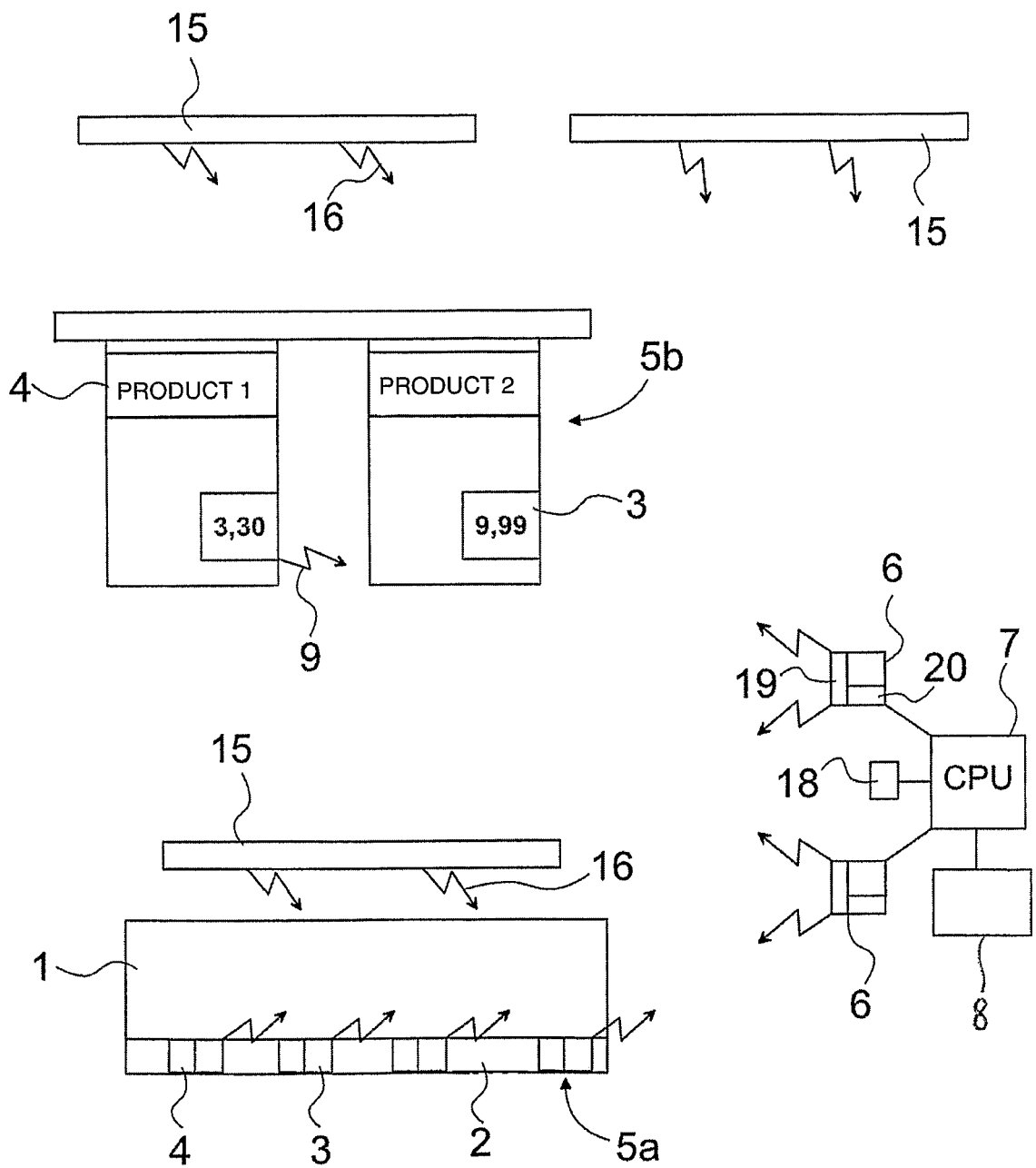
FIG. 1 shows a schematic and simplified view of an arrangement of the invention in a supermarket or in corresponding sales premises, applied in connection with display units.

FIG. 1 shows a schematic and simplified view of an arrangement according to the invention in a supermarket or in corresponding sales premises. Product shelves 1 are equipped with shelf rails 2, on which display units 5a equipped with, for example, electrophoretic laminate displays 3 and product information 4 are placed in locations corresponding to products. The laminate display 3 is arranged to display the price of the product, and the product information 4 contains, among other things, the name of the product and possibly some other information relating to the product. In a corresponding manner, there are, in required locations in the sales premises, hanging display units 5b forming a display pocket, which also comprise both an electrophoretic laminate display 3 and product information 4. Each electronic laminate display 3, or shortly display 3, constitutes a thin price tag equipped with display segments and resembling a paper price tag, in which the required product prices and other necessary symbols are formed by changing the colour of the substantially two-coloured display segments. One layer of the display is, for example, an active ink layer. The ink layer contains a number of microcapsules filled with liquid and containing, for example, substantially black particles with a positive surface charge and substantially white particles with a negative surface charge, whose location in the microcapsules is controlled by an electric field so that at the desired display segments, the black particles are on top, wherein said display segments look black when viewed from above, and at the other display segments, the white particles are on top, wherein these display segments look white when viewed from above. The background of the display consists of the same microcapsules, wherein, for example, the price information can be displayed as dark numbers against a light background, or vice versa, if desired. Such a display used can be, for example, the electrophoretic microcapsule display laminate disclosed in Finnish patent application No. FI 20050192.

Furthermore, the system comprises at least a central processing unit 7 equipped with communication means 6, such as a radio transmitter, via which it is possible to transmit, for example, updated price information and other control information to the display 3. Furthermore, the system may comprise scanners 8 located at cash registers and connected to the cash register system, for scanning the price, wherein the cash register system and the display units always have the same up-to-date information on the prices of the products. Furthermore, the central processing unit 7 may be coupled to other controlling and supporting systems. The wireless connection between the central processing unit 7 and the display units 5a, 5b is illustrated with arrows 9.

The application of the invention is not limited solely to price displays that employ display technology of the above-described kind, but it is obvious that the price displays can, as such, be implemented by applying any known technology. The invention is expressly related to the way of reducing interference in wireless radio communications used by display units and based on reflected signals. Furthermore, the invention is not limited solely to reducing interference in radio communications used in price displays only, but the invention can also be applied in radio communications between other electronic devices, in which, in principle, corresponding technology based on reflected signals is applied. Consequently, the examples presented herein and focusing on price displays must be considered as examples but not the sole embodiments of the invention.

In a shop, there are commonly fluorescent lamps 15 on the ceiling and on the edges of product shelves. When these lamps are alight, they may, due to their way of operation, cause interference in communications between the communication means 6 and the display units 5a and 5b. The spurious signals produced by fluorescent lamps 15 as interference sources are illustrated with arrows 16 in FIG. 1. The spurious signals 16 are normally very close to the weak signal/frequency produced by the communication means 6 and reflected back by the display units 5a, 5b, in which case the spurious signals 16 easily suppress these reflected signals. As a result, it is difficult for the communication means 6 to distinguish the signals reflected by the display units 5a, 5b from the spurious signals in a reliable way.

Figure 2:
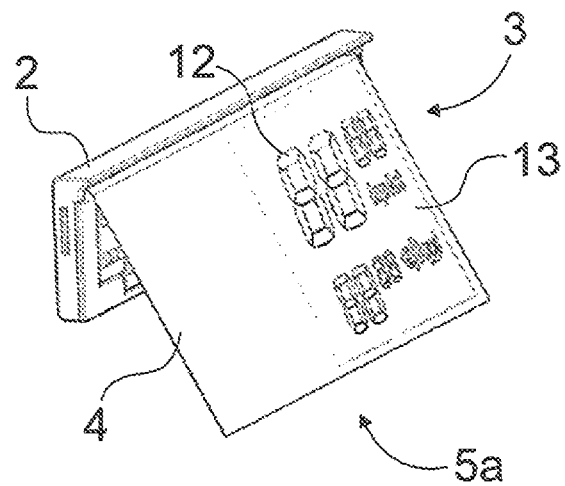
FIG. 2 shows a display unit, in which the arrangement of the invention is applied, seen obliquely from the front.
Figure 3:
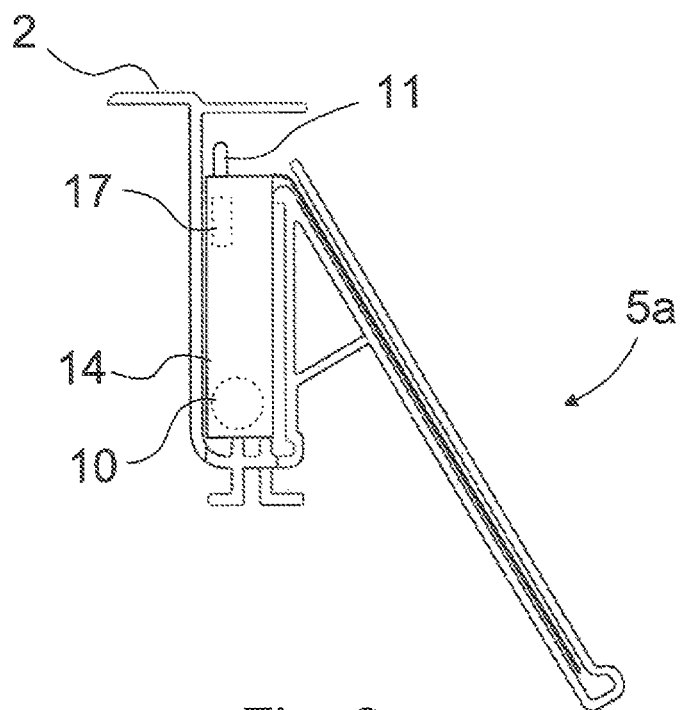
FIG. 3 shows a side view of a display unit, in which the arrangement according to the invention is applied.

FIGS. 2 and 3 show, in more detail, one example of the type of the display unit 5a attached to a shelf rail 2. A display driver 14 connected to the display 3, and a receiver 11 equipped with an antenna, as well as a power source 10, which is, for example, a conventional battery, are fixed to the back of the display unit 5a. The power source 10 is arranged to supply electric energy to the display unit 5a and its display driver 14. Price information or other information shown on the display 3 by means of the receiver 11 and the display driver 14 can be updated in a wireless manner from the central processing unit 7. In this embodiment example, the updating and control data is transmitted by means of radio waves, but also other ways of data transmission are feasible. Each display laminate 3 constitutes a thin price tag equipped with display segments 12 and resembling a paper price tag, on which the required product prices and other necessary symbols are formed by changing the colour of substantially two-coloured display segments 12. The colour of the display segments 12 as well as of the background 13 is changed by means of an electric field formed by electric current, as described above.

In the following, the use of the reflection of the display unit between said unit and the system for controlling it in a wireless manner will be described further in more detail.

In the arrangement according to the example, the display units 5a, 5b comprise mode changing means 17 for changing the mode of the antenna of the receiver 11 between at least two different modes, whereby, for example in the first mode, the reflectance of the antenna is good and, in the second mode, the reflectance is poor. In a corresponding manner, the antenna modes can be adjusted by the mode changing means 17 so that the antenna reflects radio waves in different phases in the different modes. Consequently, the display unit 5a, 5b is fitted to vary the mode of the antenna of its receiver 11 to produce a reflection encoded in a given way and having a time delay varying according to the antenna mode. The communication means 6 interpret the different time delays as encoded data signals transmitted by the display unit 5a, 5b, on the basis of which, for example, the communication means 6 identify each display unit. It is exactly these signals that are disturbed and suppressed by other ambient spurious signals 16, such as those emitted from fluorescence lamps 15.

The above-mentioned encoding implies, in its simplest form, that the display unit 5a, 5b reflects back the carrier wave transmitted by the communication means 6, which may have a frequency of, for example, 685 MHz so that the display unit 5a, 5b grounds the antenna of the receiver 11 by means of the mode changing means 17 at the frequency of, for example, 150 kHz, thereby producing a kind of square wave from the reflected signal. The display unit 5a, 5b thus affects the reflected signal by changing the mode of the antenna 11. In this reflection, the phase shift of the signal would be preferably 180 degrees, at which the detection of a low-powered reflection by the communication means 6 is at its best.

According to the present invention, the interference effect of the spurious signals 16 is eliminated by switching either the transmitter or the receiver of the communication means 6 off and on again substantially at the frequency of the spurious signals so that when the spurious signals are the strongest, the transmitter or receiver is switched off. Consequently, the signal transmitted by the communication means 6 and reflected by the display units is only received when the spurious signals are at their weakest, wherein the signal-to-noise ratio of the reflected signal is always substantially good. For this purpose, control means 18 are provided, for example, in connection with the central processing unit 7 and coupled to the same power supply system, from which electric energy is supplied to the fluorescent lamps 15 causing spurious signals, the frequency of the spurious signals being synchronous with the frequency of the electric energy produced by the power supply system. The power supply system may be, for example, a mains network, via which electric energy is typically supplied in the form of alternating voltage and current (AC). However, the invention is not limited to be used solely with a mains network, but it can also be applied in connection with other systems producing and/or transforming electric energy. Some non-restrictive examples to be mentioned of other systems that produce electric energy include aggregate systems, systems based on wind power and solar energy.

The control means 18 are adapted to determine a substantially fixed switching point from the period of electric current or electric voltage from the mains network and to switch the transmitter or receiver of the communication means 6 of the central processing unit 7 off for a moment and on again at said substantially fixed switching point. If multi-phase voltage is used to supply electric energy to the devices that cause interference, the control means 18 are adapted either to activate the switching of the transmitter or receiver at each phase or part of the phases, for example only at the phase that causes the strongest spurious signals. In this case, the control means 18 are also adapted to measure the strength of the spurious signals.

In all the above-mentioned cases, the control means 18 activate the switching on and off of the transmitter or receiver once during one period of each phase. The duration of switching off may be constant or it may vary. If the duration is intended to be varied, the control means 18 are equipped with a function to measure the required switching-off time and to control the function of switching off.

It will be obvious for a person skilled in the art that the invention is not limited solely to the embodiment examples presented above, but it may vary within the scope of the claims to be presented below. Consequently, the transmitter or receiver of the communication means can also be switched off elsewhere than at a given fixed point of the period. In this case, the control means 18 are adapted to measure the occurrence of spurious signals 16 by taking several measurements during a period and to activate the switching on and off of the transmitter or receiver at several different points of the period, if necessary. The best switching point is determined on the basis of the above-mentioned measurements.

A corresponding technique can be applied in a number of systems in addition to the shelf displays described above, for example for displaying shelf codes and data in storages or for changing the titles of sorting compartments in distributing systems.

Similarly, it will be obvious for a person skilled in the art that the central processing unit does not necessarily need to be coupled to the same power supply system as the devices that cause spurious signals, such as fluorescent lamps. In such a case, it is fitted separately to measure the phase and amplitude of the spurious signals and to determine the best moment of time for switching the transmitter or receiver of the communication means off and on again. In this case, the control means of the central processing unit require a precise frequency reference, so that the interval of switching of the transmitter or receiver of the communication means would be synchronized with the electric current.

The invention claimed is:

1. An arrangement for reducing an effect of electromagnetic spurious signals in telecommunications radio frequencies, wherein the electromagnetic spurious signals emanate from fluorescent lamps in an operating environment, the arrangement comprising:
   a communication unit comprising a radio transmitter, a radio receiver, a set of antennas configured to receive and reflect back radio signals from the communication unit, wherein the reflectance of the radio signals by the antennas differs in different modes; and
   a control unit adapted to activate a switching of the transmitter or the radio receiver of the communication unit in synchronization with a frequency of the spurious signals emanating from the fluorescent lamps in the operating environment, such that the radio transmitter or the radio receiver is switched off when the spurious signals have a strength not less than a predetermined value, wherein the control unit is coupled to a same power supply that powers the fluorescent lamps, and wherein the spurious signals are synchronous with a frequency of electric energy produced by the power supply, such that the power supply produces a multi-phase voltage and the control unit either activates the switching of the transmitter or receiver at each phase or part of each phase.

2. The arrangement according to claim 1, wherein the control unit is adapted to switch the transmitter or receiver of the communication unit off and on again substantially at a frequency of the spurious signals so that when the spurious signals are at a strongest strength, the transmitter or receiver is switched off.

3. The arrangement according to claim 1, wherein the control unit is configured to measure a strength of the spurious signals and to switch the transmitter or receiver of the communication unit off and on again so that a signal transmitted by the communication unit and received by the transmitter or receiver of the communication unit as a reflection is received in the receiver of the communication unit only when at least one of said spurious signals is at a weakest strength.

4. The arrangement according to claim 1, wherein the control unit is configured to determine a fixed switching point from a period of a voltage used for supplying electric energy to the device that causes spurious signals, at which period the spurious signals are interferingly strong, and to switch the transmitter or receiver of the communication unit off for a moment and on again at said fixed switching point.

5. The arrangement according to claim 1, wherein the control unit is configured to measure a strength of the spurious signals such that the switching of the transmitter or receiver is activated either separately at each phase or only at a phase that causes strongest spurious signals.

6. The arrangement according to claim 1, further comprising:
a display unit comprising a display and a receiver configured to receive and reflect back the radio signals of the communication unit.

7. The arrangement according to claim 6, wherein the display is configured to present information received by said receiver that receives and reflects back the radio signals of the communication unit.

8. The arrangement according to claim 6, wherein the arrangement is configured to transmit price information on a product to said receiver that receives and reflects back the radio signals of the communication unit.

9. The arrangement according to claim 1, wherein the power supply is a mains network configured to supply AC power.

10. The arrangement according to claim 1, further comprising:
a mode changer configured to alter the reflectance of the radio signals by the antennas.

11. The arrangement according to claim 1, wherein the mode changer alters a reflectance of the antennas such that the antennas reflect radio waves in different phases in the different modes.

12. The arrangement according to claim 1, wherein the mode changer alters a reflectance of the antennas such that the antennas reflect radio waves better in one mode than in another mode.

13. A method for reducing an effect of electromagnetic spurious signals in telecommunications radio frequencies, wherein the electromagnetic spurious signals emanate from fluorescent lamps in an operating environment, the method comprising:
transmitting radio signals with a radio transmitter of a communication unit,
receiving the transmitted radio signals with receivers of the communication unit,
reflecting back the received radio signals with antennas of the receivers of the communication unit, wherein reflection of the radio signals differs in different modes, and
utilizing a control unit to activate a switching of the transmitter or receiver of the communication unit in synchronization with the frequency of the spurious signals emanating from the fluorescent lamps in the operating environment, such that the radio transmitter or the radio receiver is switched off when the spurious signals have a strength not less than a predetermined value, wherein the control unit is coupled to a same power supply that powers the fluorescent lamps, and wherein the spurious signals are synchronous with a frequency of electric energy produced by the power supply, such that the power supply produces a multi-phase voltage and the control unit either activates the switching of the transmitter or receiver at each phase or part of each phase.

14. The method according to claim 13, further comprising:
switching off and on again the transmitter or receiver of the communication unit substantially at a frequency of the spurious signals so that when the spurious signals are at a strongest strength, the transmitter or receiver is switched off.

15. The method according to claim 13, further comprising:
measuring a strength of the spurious signals, and
switching the transmitter or receiver of the communication unit off and on again so that the signal transmitted by the communication unit and received by the transmitter or receiver of the communication unit as a reflection is received by the receiver of the communication unit only when at least one of said spurious signals is at a weakest strength.

16. The method according to claim 13, further comprising:
determining a fixed switching point from a period of the voltage used for supplying electric energy to the device that causes spurious signals, at which period the spurious signals are interferingly strong, and
switching the transmitter or receiver of the communication unit off for a moment and on again at said fixed switching point.

17. The arrangement according to claim 13, further comprising:
measuring the strength of the spurious signals, and
switching the transmitter or receiver either separately at each phase or only at a phase that causes strongest spurious signals.

18. The method according to claim 13, further comprising:
displaying information received by the reflecting receivers.

19. The method according to claim 13, further comprising:
transmitting price information on a product to said reflecting receivers.

20. The method according to claim 13, wherein the power supply is a mains network configured to supply AC power.

21. The method according to claim 13, wherein the antennas reflect radio waves in different phases in the different modes.

22. The method according to claim 13, wherein the antennas reflect radio waves better in one mode than in another mode.

* * * * *